Nov. 24, 1959     A. H. ISENBERG     2,914,090
INSULATED SUPPORTING SPACER RINGS FOR CONDUITS
Filed Jan. 13, 1959
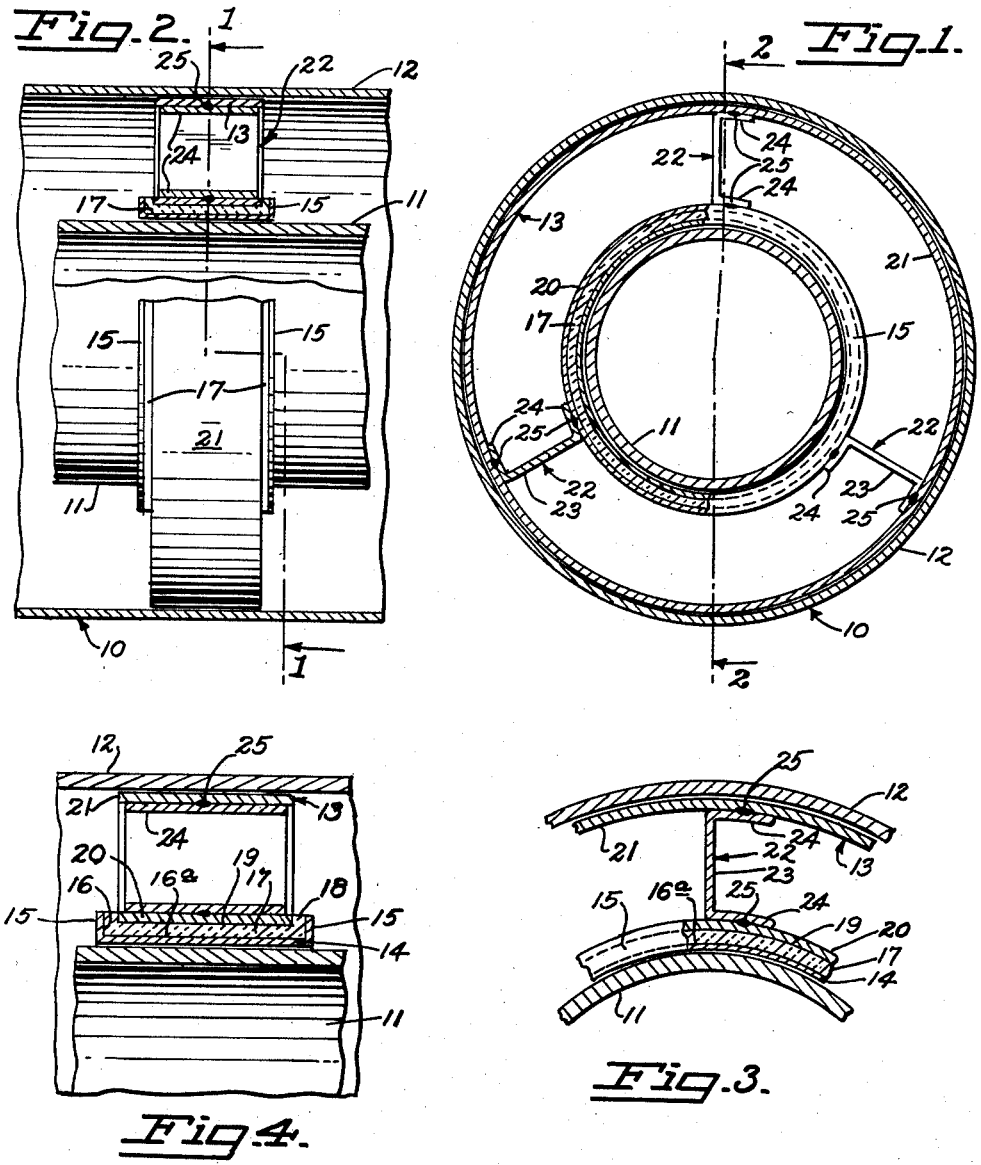
INVENTOR.
ALEXANDER H. ISENBERG
BY
ATTORNEY.

United States Patent Office 2,914,090
Patented Nov. 24, 1959

2,914,090
INSULATED SUPPORTING SPACER RINGS FOR CONDUITS

Alexander H. Isenberg, Woodside, Calif.

Application January 13, 1959, Serial No. 786,608

3 Claims. (Cl. 138—63)

This invention relates to supporting spacer rings in conduits, and more particularly relates to such spacer rings which include a body of thermal and/or electrical insulation interposed between an outer casing and an inner conveyor pipe or pipes which may be supported by the spacer ring in relatively spaced relation to the outer casing.

Such conduits are in many instances laid underground, in which event it is desirable to diminish thermal transference and electrical conductivity between the inner conveyor pipe or pipes and the outer exposed casing. Such spacer rings may also serve as a supporting guide means for the conveyor pipe or pipes within the outer casing.

While the exemplification of the invention is illustrated and described herein in relation to a single conveyor pipe within an outer casing, it is also a common practice to have a plurality of such inner pipes within a single outer casing, some of which may, and some of which may not, require thermal insulation, while generally it would be desirable to provide electrical insulation for all of such inner conveyor pipes. For a plurality of such inner pipes it would only be necessary to provide a hub ring as herein described, of suitable diameter to carry a plurality of conveyor pipes therethrough, with a spacer member supporting and spacing the plurality of pipes relative to each other, whether or not the several pipes are individually thermally insulated.

Briefly described, the invention as herein exemplified comprises a spacer ring in a conduit which has an outer casing and at least one conveyor pipe supported therein by the spacer ring in spaced relation to the outer casing, the spacer ring providing a suitable annular inner guide hub which may circumferentially directly enclose the inner conveyor pipe, an inner supporting ring circumferentially spaced from the hub, and a body of thermal and/or electrical insulation tightly therebetween. An outer support ring is circumferentially spaced from the inner support ring, and is supported in such spaced relation by spacer members which may have a radial web portion provided with supporting flanges at opposite ends of the web for engaging the opposed faces of the inner and outer supporting rings and being preferably welded thereto, the outer support ring being snugly slidably enclosed within the outer casing, and the inner conveyor pipe being snugly slidably enclosed within the inner assembly of the hub, the insulation, and the inner supporting ring, the latter assembly being concentrically supported in spaced relation to the outer supporting ring by the spacer members.

A more particular description of the invention is set forth in this specification and illustrated in the accompanying drawing, in which:

Fig. 1 is a laterally transverse section of the invention partly in section on line 1—1 of Fig. 2.

Fig. 2 is an axially longitudinal section, partly in section, on line 2—2 of Fig. 1.

Fig. 3 is a fragmentary enlarged view of part of the structure shown in Fig. 1.

Fig. 4 is a fragmentary enlarged sectional view of part of the structure shown in Fig. 2.

Referring to the drawing in which like reference characters indicate corresponding parts in the several views, 10 indicates generally a unit section of an elongated tubular conduit. These conduit units are usually prefabricated at a place of manufacture and installed as a field operation in successively aligned units in a conduit system. An inner conveyor pipe 11 is relatively spaced concentrically within an outer casing 12 and supported therein by a spacer ring member generally indicated 13. The outer casing and the conveyor pipe are elongated tubular members whereas the spacer ring structure is relatively short axially, which may be considered as its width-dimension, though manifestly of a suitable width axially of the conveyor unit to support the conveyor pipe within the outer casing. The spacer rings are relatively spaced in the conduit unit at such spacing as will sufficiently support the conveyor pipe in the conduit unit, normally including one such spacer ring adjacently spaced inwardly from each opposite end of the outer casing, since it is usual in such prefabricated conduits for the conveyor pipe to extend beyond the ends of the outer casing to conveniently facilitate the making of a field joint in which the abutting ends of conveyor pipes in next adjacently aligned conduit units are welded together.

The spacer ring comprises an annular guide hub member 14 of an inner diameter suitable for sliding snugly longitudinally and circumferentially exterior of the inner conveyor pipe, and is preferably of an axial width which defines the maximum width of the spacer ring structure. The hub member may be of relatively thin gauge metal as distinguished from supporting rings to be described. At its opposite circumferential edges the hub has radially outward flanges 15 providing an external annular channel 16. Within the channel 16 and extending across the relatively wide felly portion 16a of the channel 16 is a circumferential layer or body of electrical and/or thermal insulating material 17, such as asbestos felt extending across the entire width of the channel 16 and having its opposite edges flanged radially outward at 18 to correspond with the diameter of hub flanges 15, thus being contained within the channel 16 with circumferential edges flush with the hub flanges, and thereby providing at the outer circumferential face of said insulation material a relatively wide circumferentially recessed groove 19 which is of lesser width than the hub channel 16 due to the intervening flanges of the insulation material.

Circumferentially embedded within the groove 19 of the insulation material there is mounted an inner supporting ring 20 of heavier and more rigid sheet material than the guide hub member 14. Since it will be noted that the inner supporting ring 20 is of lesser inner diameter than the outer diameter of the flanges 15 and 18, it may be noted that in assembly of the parts the hub member 14 and the insulation 17 may be formed as relatively telescoped tubes, and the inner supporting ring 20 slid thereover, whereupon the respective flanged edges 15 of the hub and insulation flanges 18 may be turned radially outwardly to lock the inner supporting ring 20 in place within the groove 19.

Spaced radially outwardly of the inner supporting ring 20 there is an outer circumferential supporting ring 21 preferably of substantially the same thickness and rigidity as the inner supporting ring 20, the external diameter of the outer supporting ring being substantially equal to the inner diameter of the outer casing 12, with allowance for slidable clearance. Preferably the inner and outer supporting rings have substantially similar widths axially.

Mounted radially between the inner and outer supporting rings 20, 21, and maintaining them relatively spaced and providing web supports therebetween are circumferentially spaced radial spacer members generally indicated 22, which in number and circumferential spacing arrangement may vary to meet the needs of various sizes of conduits, three being shown illustratively in the present exemplification of the invention.

The radial support-and-spacer members 22 are preferably of substantially the same axial width as the inner and outer supporting rings though trifles of variation may conveniently be present and for purposes of illustration in Fig. 4, the spacer members are shown in a trifle narrower than the inner and outer supporting rings.

The spacer members 22 comprise a radial web 23 at each opposite end of which is a flange 24 substantially perpendicular to the web, the web being of a suitable radial length whereby the outer faces of the flanges superficially contact the respective inner and outer diametral faces of the inner and outer supporting rings, the flange being secured to said faces, as by welds 25.

It will be understood that the guide hub, insulation layer and the inner and outer supporting rings are concentric, assuming that the inner conveyor pipe and outer casing are likewise concentric, which would normally be the manner of use.

As stated, conduit units in which spacer rings of the invention are especially adapted for use are usually installed underground, the slidability of the conveyor pipe due to contraction and expansion being permitted by the slidable relationship between the conveyor pipe and the guide hub 14, and slidability for installation purposes is present between the outer supporting ring 21 and the inner face of the outer casing, the spacer members 22 maintaining the inner and outer supporting rings 20, 21 relatively spaced by web 23, and the thermal and electrical insulation material 17 preventing electrical conductivity from the ground to the guide hub and the conveyor pipe inwardly thereof, and preventing or at least diminishing a heat transference and loss from the conveyor pipe to the supporting rings and outer casing.

Having described the invention, what is claimed as new and patentable is:

1. A spacer ring for conduits comprising an annular hub member for encirculing an inner conveyor pipe, a layer of thermal and electrical insulation material circumferentially of said hub, an inner supporting ring securely mounted circumferentially of the insulation material, an outer supporting ring radially spaced from the inner supporting ring, and radial spacer means between the inner and outer supporting rings.

2. A spacer ring of the character described as set forth in claim 1, and in which the hub has radially extended flanges at its opposite circumferential edges providing an external circumferential channel, the insulation material being mounted in said channel and the inner supporting ring having its opposite side edges spaced from said radially extended flanges of the hub member.

3. A spacer ring for conduits as set forth in claim 2, the layer of insulation material having radially extended flanges at its opposite circumferential edges providing an annular groove therebetween, and the said inner supporting ring being mounted in said groove of the insulation material.

References Cited in the file of this patent
UNITED STATES PATENTS 2,696,835 Kaiser _____ Dec. 14, 1954
2,759,491 Everhart _____ Aug. 21, 1956